Dec. 14, 1937.                B. MILLER                 2,102,371
                          IMPULSE RATE METER
                          Filed June 4, 1936
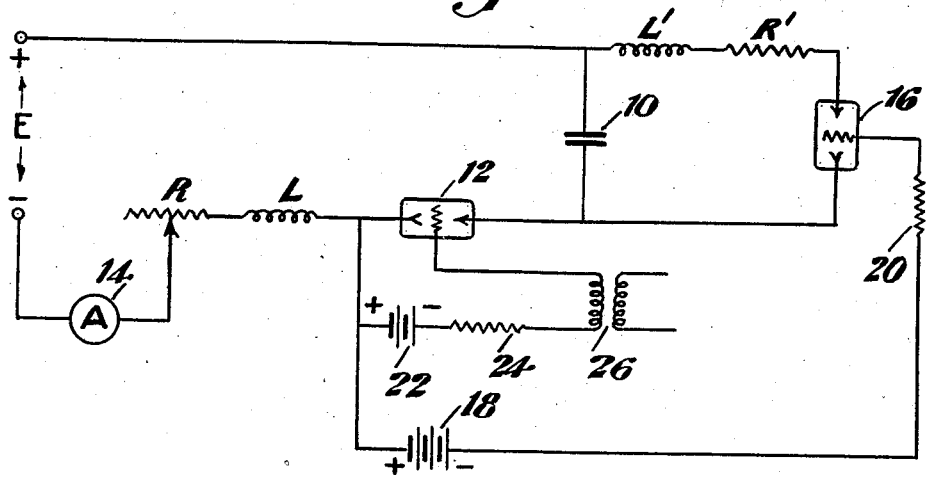
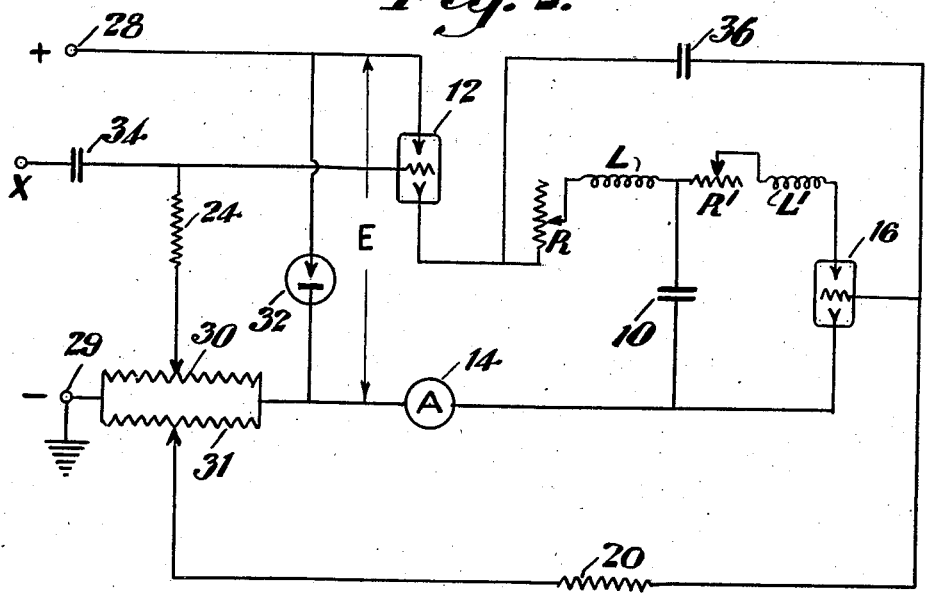
INVENTOR
BENJAMIN MILLER
BY Edmund G. Borden
ATTORNEY Patented Dec. 14, 1937

2,102,371

UNITED STATES PATENT OFFICE 2,102,371

IMPULSE RATE METER

Benjamin Miller, Richmond Hill, N. Y., assignor to Power Patents Company, Jersey City, N. J., a corporation of Maine Application June 4, 1936, Serial No. 83,447

3 Claims. (Cl. 175—368)

This invention relates generally to electric rate meters, and is more particularly directed to an improved meter adapted for measuring the average frequency of impulses which occur at random. The invention herein described is an improvement on that described in my U. S. Patent No. 2,073,247, patented March 9, 1937, for Electric flash producing method and apparatus.

One rate meter which is described in my aforementioned Patent No. 2,073,247 is adapted for measuring the frequency of electrical impulses. This rate meter comprises essentially an electric condenser which is charged from a source of potential through an oscillatory charging circuit including a resistance, an inductance, and an electric check valve. The condenser is shunted by a discharge circuit including a resistance, an inductance, and a trigger tube which is normally non-conducting. The non-conducting state of the trigger tube may be due to a negative bias impressed on the grid element of the tube by means of a battery through a resistance. The trigger tube may be put into a conducting state by an appropriate impulse the rate of which is to be measured, as for example by a positive voltage impressed on its grid through a transformer. When the trigger tube becomes conducting, the condenser is discharged, and is then recharged from the source of potential. An ammeter connected in series circuit with the condenser measures the current flowing through the trigger tube and may be calibrated in terms of the frequency of the impulses which are applied to the trigger tube to put it in the conducting state. The term "trigger tube" designates a gaseous conductor device in which conduction of current through a gaseous medium between two primary electrodes is initiated by applying the proper stimulus, as for example by changing the potential of a third electrode. The electric check valve used in the condenser charging circuit may be a hot cathode rectifier tube.

For satisfactory operation of an impulse rate meter of the type above described, it is necessary that the time required for discharge of the condenser shall be short in comparison with the time required to charge the condenser, and it is also necessary that the time required for a complete cycle of condenser discharge and charge shall be less than the time elapsing between successive impulses being measured. Experience has shown that this rate meter operates satisfactorily for measuring the frequency of impulses which recur regularly or with a minimum interval between successive impulses. However, when the meter is used to measure the average frequency of impulses which occur at random, occasionally two impulses occur successively within an interval which is less than the time required for a complete cycle of condenser discharge and charge, and there will eventually be an impulse applied to the trigger tube while a considerable condenser charging current is flowing through the check valve. Under these conditions current is transferred to the trigger tube to keep it in a conducting state and prevent its deionization, thus rendering the rate meter inoperative for measuring subsequent impulses because current flows continuously.

Impulses from cosmic rays or from radioactive disintegration are purely random, and the present invention is specifically adapted to measuring the average frequency of such impulses.

A primary object of the present invention is therefore to provide an impulse rate meter which shall be operative for measuring the average frequency of random impulses, and which shall be rendered inoperative only temporarily during application thereto of impulses the intervals between which are shorter than those for which the instrument has been designed.

With the above and other objects and features in view the invention consists in the improved impulse rate meter which is hereinafter described and particularly defined by the accompanying claims.

The invention will be more particularly described by reference to the accompanying drawing in which Fig. 1 is a wiring diagram of a condenser discharge trigger tube rate meter with an oscillating condenser charging circuit including a normally non-conducting trigger tube and an ammeter for measuring current flowing through the trigger tube in the charging circuit; and Fig. 2 is a modified form of the rate meter shown in Fig. 1.

The improved impulse rate meter which is illustrated in the drawing embodies features of an inverter circuit previously described in my U. S. Patent No. 2,043,484 patented June 9th, 1936, for Variable frequency stroboscope. The inverter which is described in my above-mentioned Patent No. 2,043,484 comprises essentially an electric condenser, a normally non-conducting trigger tube through which the condenser may be discharged, an oscillating charging circuit for the condenser including a source of potential, resistance, inductance and an electric check valve, and an ammeter for measuring the current flowing through the trigger tube. The non-conducting state of the trigger tube is due to a negative bias impressed on the grid of the tube by connecting the grid with the cathode of the electric check valve through a resistance, so that the grid is biased with respect to the cathode of the trigger tube by the cathode-anode potential of the electric check valve. Additional bias may be provided by including a battery in the grid circuit. The trigger tube element of the inverter is thus maintained in a non-conducting state so long as current flows through the electric check valve, and when current ceases to flow through the check valve the trigger tube immediately becomes conducting to discharge the condenser, so that the condenser is automatically discharged as soon as the condenser is charged to its maximum potential.

The improved impulse rate meter which is illustrated in Fig. 1 of the drawing embodies a condenser 10 which is charged from a source of potential E which may be a battery. The condenser charging circuit includes an inductance L and a variable resistance R. The charging circuit of condenser 10 also includes an electric check valve 12 in the form of a trigger tube which is normally non-conducting, and an ammeter 14.

The discharge circuit of condenser 10 includes an inductance L', a resistance R' and a trigger tube 16. The grid of tube 16 is normally maintained negative with respect to its cathode by a battery 18. The negative terminal of battery 18 is connected to the grid of tube 16 through a resistance 20.

As shown in Fig. 1, the positive terminal of battery 18, and consequently the grid of trigger tube 16, is connected to the cathode of trigger tube 12 so that the grid of tube 16 is biased with respect to its cathode by the cathode-anode potential of tube 12. The normally non-conducting state of tube 12 may be due to a grid negatively biased with respect to its cathode by a battery 22, the negative terminal of which is connected to the grid through a resistance 24.

The impulses whose average frequency the improved rate meter is to measure, may be delivered to the grid of tube 12 by means of a transformer 26 having one of its coils connected in the grid circuit. As previously indicated, the condenser charging circuit is an oscillatory circuit, so that the maximum potential of condenser 10 has a greater value than the source potential E. The ratio of maximum condenser potential to source potential may be controlled by controlling the ratio of resistance R to inductance L in the condenser charging circuit. The rate meter may thus be calibrated by connecting the grid of tube 12 (or transformer 26) to a source of impulses of known frequency, and adjusting the variable resistance R to bring the needle of ammeter 14 to that speed on its scale. In this way the meter can be quickly adjusted to measure impulse frequencies which may vary over a wide range, as more fully explained in my Patent No. 2,068,147.

When trigger tube 12 is rendered conducting by an impulse delivered to its grid through transformer 26, condenser 10 is charged from source E. As soon as the potential of condenser 10 reaches its maximum, trigger tube 12 resumes its normal non-conducting state and functions as an electric check valve. However, this condition of condenser 10 and trigger tube 12 causes trigger tube 16 to become conductive, so that condenser 10 is immediately discharged. Each succeeding impulse applied to tube 12 causes charging followed by discharge of condenser 10, except that any impulses occurring while trigger tube 12 is already in a conducting state are ineffective.

The modification which is illustrated in Fig. 2 of the drawing contains many of the elements shown in Fig. 1, and these have the same numbers in both figures. Fig. 2 shows a modification employing but one source of potential which may be obtained from the lighting circuit in known ways. A direct current potential is impressed between terminals 28 and 29. Terminal 29 may be grounded as shown. Current flows through potentiometers 30 and 31 which are in parallel, and through voltage regulator 32. The potential E across voltage regulator 32 is used to charge condenser 10 through tube 12, resistance R, inductance L, and ammeter 14. The discharge circuit of condenser 10 includes resistance R' which may be variable as shown, inductance L' and tube 16. Tube 12 is normally maintained in the non-conducting state by a negative bias maintained on its grid through resistance 24 from potentiometer 30. Tube 16 is normally maintained in the non-conducting state by a negative bias impressed on its grid through resistance 20 from potentiometer 31.

The impulses whose rate is to be measured are impressed upon the grid of tube 12 through condenser 34, connections being made between terminals X and 29. When a positive impulse is impressed between terminal X and ground, tube 12 becomes conducting and current flows to charge condenser 10, the cathode of tube 12 being negative with respect to its anode. When the potential of condenser 10 reaches its maximum value it tends to discharge back through tube 12 which however acts as a check valve. The potential across tube 12 is thus reversed, the cathode becoming positive with respect to the anode. This reversal of potential causes tube 12 to resume the non-conducting state, and is transmitted through condenser 36 to the grid of tube 16, rendering 16 conductive and thereby causing condenser 10 to discharge through resistance R' and inductance L'. When current flow through tube 16 ceases, it also resumes the non-conducting state and no further current is drawn through ammeter 14 until another positive impulse is applied to terminal X. It will be appreciated that positive impulses applied to terminal X while tube 12 is in the conducting state will have no effect.

It will be noted that the circuit shown in Fig. 2 differs from that shown in Fig. 1 in several respects. In Fig. 1 the impulses are delivered through transformer 26, while in Fig. 2 they are delivered through condenser 34. In Fig. 2 the resistance R' of the discharge circuit is variable and this resistance may be used instead of or in addition to resistance R for calibration.

As an example of the application of the invention, there will be described an instrument whose wiring diagram is given in Fig. 2. The potential of terminal 28 with respect to ground is about 125 volts. Potentiometers 30 and 31 have each a resistance of 2500 ohms. 32 is a type 874 voltage regulator tube maintaining across its electrodes a potential of about 90 volts. Tubes 12 and 16 are argon filled grid controlled rectifiers type 885. 14 is a milliammeter requiring five milliamperes for full scale deflection. R has a maximum resistance of 5000 ohms. L is ten henries. 10 is 0.5 microfarad. R' has a maximum resistance of 350 ohms. L' is 25 millihenries. 34 and 36 are 0.001 microfarad; and 20 and 24 each have a resistance of 25000 ohms. Such an instrument will be affected by all impulses having intervals of at least 0.01 second, and the full scale reading may be adjusted to be 100 impulses per second or lower, down to about 60 impulses per second.

The reading of ammeter 14 therefore is a measure of the frequency of impulses which are applied to trigger tube 12, but a measure which is inaccurate if there are impulses which occur so soon after a prior impulse that the cycle of condenser charge and discharge initiated by such prior impulse has not been completed. In the case of purely random impulses, the fraction so lost may be small and can be calculated and allowed for, although this will not be necessary when only comparative readings are desired. By proper adjustment of the circuit constants so as to respond to all impulses occurring at somewhat higher than the average expected frequency, the number of random or accidental impulses so lost will be very few and the error will, in general, be negligible.

The invention having been thus described, what is claimed as new is:

1. In an electric impulse rate meter, a condenser, a source of energy for charging the condenser, means connected in series circuit with the energy source and with the condenser for charging the condenser to a potential higher than the potential of the energy source, said means comprising a normally non-conducting trigger tube and an inductance forming with the condenser an oscillating circuit, automatic means for discharging the condenser as soon as it reaches its maximum potential, and means for applying the impulses whose rate is to be measured to the trigger tube thereby rendering said trigger tube conductive.

2. An impulse rate meter comprising a condenser, a source of potential for charging the condenser, means connected in series circuit with the energy source and with the condenser for charging the condenser to a potential higher than the potential of the energy source, said means comprising a normally non-conductive trigger tube and an inductance forming with the condenser an oscillating circuit, means for discharging the condenser comprising a second trigger tube and means for applying thereto the voltage impulse which occurs at the instant that current ceases to flow through said first trigger tube thereby rendering said second trigger tube conductive, and means for rendering said first trigger tube conductive by impressing thereon the impulses the rate of which is to be measured.

3. An impulse rate meter comprising a condenser, a source of potential for charging the condenser, means connected in series circuit with the energy source and with the condenser for charging the condenser to a potential higher than the potential of the energy source, said means comprising a normally non-conductive trigger tube and an inductance and resistance forming with the condenser an oscillating circuit, means for discharging the condenser comprising a second trigger tube and means for applying thereto the reversal of potential which is developed in said first trigger tube at the instant that the potential of said condenser reaches its maximum value, thereby rendering said second trigger tube conductive, and means for rendering said first trigger tube conductive by impressing thereon the impulses the rate of which is to be measured.

BENJAMIN MILLER.